Figure 1:
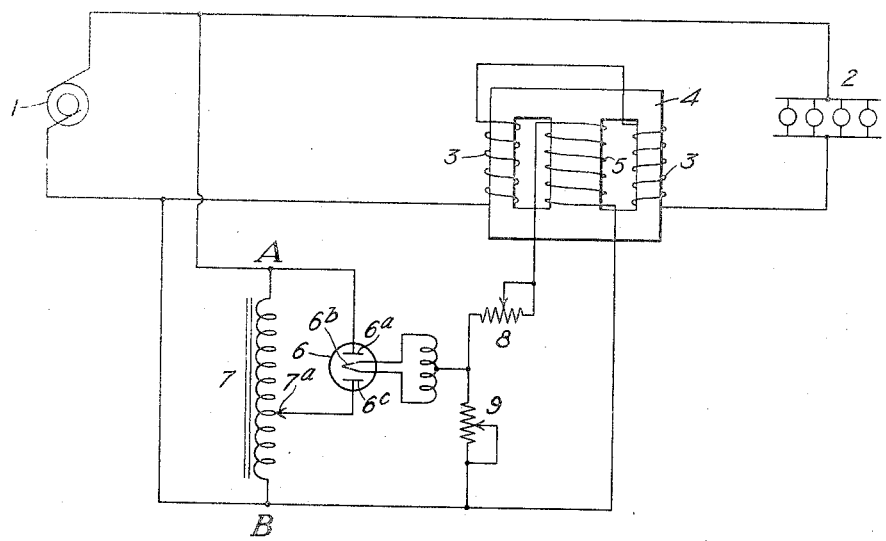

Jan. 5, 1937.　　　　F. G. LOGAN　　　　2,067,143
ELECTRIC CONTROLLING APPARATUS
Filed Dec. 18, 1934

INVENTOR
Frank G. Logan
BY Lawrence K. Sager
his ATTORNEY

Patented Jan. 5, 1937

2,067,143

UNITED STATES PATENT OFFICE 2,067,143

ELECTRIC CONTROLLING APPARATUS

Frank G. Logan, Mount Vernon, N. Y., assignor to Ward Leonard Electric Company, a corporation of New York Application December 18, 1934, Serial No. 758,000

10 Claims. (Cl. 171—242)

This invention relates to electric controlling apparatus wherein full wave rectification from a single phase alternating current source is obtainable without the use of any auxiliary transformer and wherein the uni-directional voltage and current of the consumption circuit may be controlled as may be desired over a wide range. One particularly desirable application is in the control of the uni-directional current supplied to the direct current winding of a reactor which reactor is thereby varied in its reactance so as to affect the voltage and current supplied to the load, such as a lamp load.

The main object of the invention is to provide an improved method of the control of energy whereby the apparatus required is of a comparatively simple type and of low cost while obtaining full rectification from a single phase source. In prior practice it has been customary to use an auxiliary intermediate transformer with tap connections for obtaining full wave rectification and in which transformer each section of the secondary winding must be of approximate capacity to supply the full load current. By the present invention the necessity of such a transformer is avoided. A further object of the invention is to provide a simple method and simple apparatus of controlling the voltage and current of the load circuit over a wide range.

In Patent #1,977,193 granted October 16, 1934, on my prior application, I have disclosed a method and apparatus variably controlling the uni-directional energy supplied to a consumption circuit and derived from an alternating current source wherein the phase of alternating current waves is shifted with reference to the phase of other alternate waves and wherein the energy of the uni-direction circuit is derivable from the alternating current source during each portion of the alternating current cycle. In the present invention the energy utilized in the consumption circuit is derived from the alternating current source during alternate half cycles and current is supplied in the uni-directional consumption circuit during the other half cycles by the discharge of inductive energy in the consumption circuit. Furthermore, this invention provides a method and means whereby the inductive discharge during alternate half periods is controlled over wide limits for affecting the resultant voltage and current in the uni-directional consumption circuit. This may be varied as desired. Other objects and advantages of the invention may be understood from the following description and accompanying drawing which illustrates preferred embodiments thereof.

Figure 2:
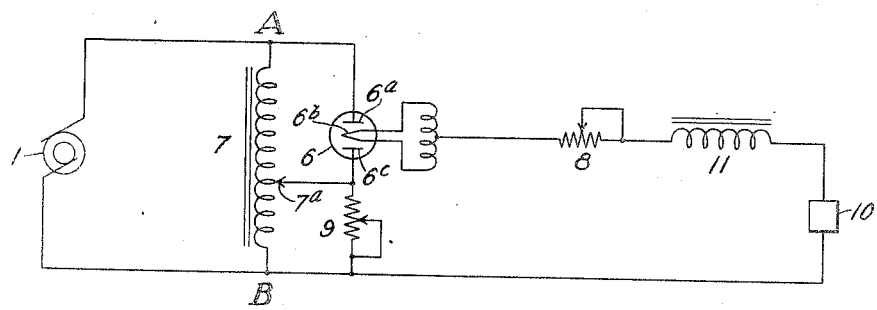

Fig. 1 is a diagram showing an application of the invention to the control of a reactor whereby the voltage and current of an alternating current lamp circuit is controllable over a wide range; and Fig. 2 is a diagram showing the invention applied to the control of uni-directional current supplying any desired translating device.

Referring to Fig. 1, a single phase source 1 supplies alternating current to the load 2, shown as a lamp load, through the alternating current windings 3 of a reactor having a core 4. This reactor is shown of the common three-legged type as a conventional showing but may be of any form. The uni-directional controlling winding 5 is shown on the middle leg of the core and represents the uni-directional inductive load supplied with energy derived from the alternating current source in accordance with the present invention. A two anode rectifier 6, which may be of any type is indicated, and, if desired, two single anode rectifiers may be used as will be understood by those skilled in the art. The anode 6$^a$ is connected to one side of the single phase source and the cathode 6$^b$ to one terminal of the inductive winding 5, the other terminal being connected to the other side of the single phase source. Thus, the winding 5 is adapted to receive energy from the alternating current source during alternate half cycle periods. Across the alternating current supply lines is connected an inductive device 7, being indicated as an inductive winding on an iron core having an adjustable contact or slider 7$^a$ adapted to contact successively with the different turns of the winding, or taps therefrom, over its entire length. Although this device is indicated as an inductive winding with a slidable contact, it may be of any character which will serve to permit the potential and phase of a terminal, such as 7$^a$, to be adjusted from that of one side A of the alternating current source to the other side B of the source. The contact or terminal 7$^a$ is connected to the anode 6$^c$ of the full wave rectifier. In series with the load winding 5 is an adjustable resistance 8 for limiting the maximum current in the circuit of the load to a predetermined desired amount. An adjustable resistance 9 of comparatively high value, is connected in shunt across the load circuit from the cathode side thereof to the side of the circuit containing the connection point B.

The mode of operation may be most easily understood by assuming that the contact 7$^a$ is adjusted to the upper end of the inductive coil so as to have the same potential and phase as the point A. Under this condition, only a comparatively small amount of current will be supplied to the inductive load winding 5, because both anodes of the rectifying means will always have the same potential and phase as each other and the apparatus will act as a half wave rectifier endeavoring to supply intermittent half waves of uni-directional energy to the winding 5. During the alternate half periods the inductive action of the winding 5 will tend to cause the discharge current to pass in its local load circuit through the comparatively high resistance 9 and comparatively low resistance 8. Owing to the resistance 9 being high, this discharge current is comparatively small and may be adjusted to such value as will give the minimum desired current under the condition of the contact 7ª coinciding with point A. The discharge circuit for the inductive energy of the winding 5 during alternate half periods is limited to passing through the high resistance 9 owing to the fact that the contact 7ª coincides with point A as to potential and phase and will not permit any discharge of current through the anode 6ᶜ during the half periods of the reverse cycle because, in the meantime, the potential and phase of the anode 6ᶜ has become reversed with respect to the direction of the discharge current and with respect to its potential during the charging half cycle. Now assume that the contact 7ª be adjusted gradually from that having the potential and phase of point A to that having the potential and phase of point B. This will cause the uni-directional current in the load winding 5 to gradually increase from a minimum to a maximum determined by adjustment of the resistance 8 to such value as to limit the maximum uni-directional load current. The gradual increase of load current is due to the fact that when the terminal 7ª gradually changes from the potential and phase of point A to that of point B, the potential and phase of the anode 6ᶜ changes correspondingly and thus the discharge current in the load circuit finds a path of less and less opposition through the point B, terminals 7ª, anode 6ᶜ and cathode 6ᵇ in shunt around the high resistance 9, thus permitting the flow of more and more discharge current in the load circuit through this path during the half cycles when the control apparatus is not receiving energy from the alternating current source; and when contact 7ª is adjusted to coincide in potential and phase with that of point B, the potential and phase of anode 6ᶜ no longer acts in opposition to the passage of discharge current in the load circuit and at this time full opportunity is afforded to the discharge current being effective in the load circuit by its passage from one terminal of winding 5 through the point B, contact 7ª, anode 6ª and resistance 8 to the other terminal of winding 5.

Thus by practicing this method of supply of energy from the alternating current source during intermittent periods or half cycles and controlling the inductive discharge energy during intervening periods or alternate half cycles, the current in the winding 5 may be adjusted over a wide range. The auxiliary discharge circuit path comprising the point B, terminal 7ª and anode 6ᶜ affords a variable discharge path containing an electric one way valve device affected by the value of the potential and phase imposed thereon for controlling the discharge current. Obviously as the current in the winding 5 of the reactor is changed from a low value to a high value, the reactance is likewise changed to bring the lamp load 2 from a condition of very low current value to a high current value to give the desired control. Although this application of the invention is particularly advantageous, it may be applied to various uses and purposes where the uni-directional current load, such as the winding 5, is inductive. The invention may likewise be applied to supply uni-directional energy to load of any character by the introduction of inductance in the load circuit.

In Fig. 2 is disclosed a general application of the invention wherein the translating device 10 may be of any character and is shown as connected in the uni-directional load circuit. In this figure the parts corresponding to those of Fig. 1 are similarly designated. In this case, assuming that the device 10 has no inductance, or insufficient inductance, an inductive winding 11 is placed in series therewith in the consumption circuit for providing sufficient inductance therein to give the required amount of discharge energy during alternate half periods. Obviously the mode of operation of the apparatus of Fig. 2 will be the same as already described in connection with Fig. 1. Where adjustability of the load current is not required, the terminal 7ª may be permanently fixed at any desired point of adjustment from point A to point B. Likewise, the limiting resistance 8 or 9 may be omitted where unnecessary or not desired in particular cases.

Although I have described the invention in its general application as to mode of operation and indicated conventional types of apparatus, it will be understood that various embodiments thereof may be made and the invention utilized in various applications without departing from the scope thereof.

I claim:

1. An alternating current source, means for supplying a rectified current intermittently to a consumption circuit having inductance, and means for providing an auxiliary discharge path through the consumption circuit during intervening periods only.

2. An alternating current source, means for supplying a rectified current intermittently to a consumption circuit having inductance, means for providing an auxiliary discharge path through the consumption circuit during intervening periods only, and adjustable means for controlling the value of the discharge current.

3. An alternating current source, means for supplying a rectified current intermittently to a consumption circuit having inductance, and an auxiliary shunt path to said circuit for providing a discharge path during intervening periods, said shunt path having an electric valve device for controlling the discharge current.

4. An alternating current source, a consumption circuit having inductance, means for supplying from said source intermittent unidirectional current to said circuit, and an auxiliary discharge circuit in shunt to said consumption circuit for controlling the value of the discharge current during intervening periods only.

5. An alternating current source, a consumption circuit having inductance, means for supplying from said source intermittent unidirectional current to said circuit, an auxiliary discharge circuit in shunt to said consumption circuit for controlling the value of the discharge current during intervening periods, and means for imposing a potential on said discharge circuit variable in value and phase from that of one side of said source to that of the other side of said source.

6. An alternating current source, a consumption circuit having inductance, means for supplying from said source intermittent unidirectional current to said circuit, an auxiliary discharge circuit in shunt to said consumption circuit for controlling the value of the discharge current during intervening periods, and adjustable inductive means for imposing a potential on said discharge circuit variable in value and phase from that of one side of said source to that of the other side of said source.

7. An alternating current source, rectifying means for supplying from said source to a consumption circuit intermittent unidirectional energy, said circuit having inductance, an auxiliary discharge circuit in shunt to said consumption circuit, said discharge circuit containing an electric valve device, and means for imposing on said valve device a controlling potential of desired value and phase.

8. An alternating current source, rectifying means for supplying from said source to a consumption circuit intermittent unidirectional energy, said circuit having inductance, an auxiliary discharge circuit in shunt to said consumption circuit, said discharge circuit containing an electric valve device, and inductive means for adjusting the potential and phase applied to said valve device to graduated values ranging between those of the two sides of said source for controlling the current in said discharge circuit.

9. An alternating current source, a reactor having a winding receiving current from said source, a load supplied with current from said reactor winding, a controlling winding on said reactor, a rectifying device for supplying current intermittently to said controlling winding, an auxiliary discharge circuit for said controlling winding, an electric valve in said auxiliary circuit, and means for adjusting the potential and phase imposed upon said auxiliary discharge circuit for adjusting the current delivered to said controlling winding.

10. An alternating current source, a consumption circuit having inductance, means for supplying from said source intermittent unidirectional current to said circuit, an auxiliary discharge circuit in shunt to said consumption circuit for controlling the value of the discharge current during intervening periods only, and means for adjusting the value of the discharge current.

FRANK G. LOGAN.